(12) United States Patent
Whitfill et al.

(10) Patent No.: US 7,281,583 B2
(45) Date of Patent: *Oct. 16, 2007

(54) SELF-DISSOLVING LOST CIRCULATION TREATMENT FOR PRODUCING FORMATIONS

(75) Inventors: Donald L Whitfill, Kingwood, TX (US); Bradley L. Todd, Duncan, OK (US); Trinidad Munoz, Jr., Duncan, OK (US); Ashley Donaldson, Spring, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 299 days.

This patent is subject to a terminal disclaimer.

(21) Appl. No.: 11/088,559

(22) Filed: Mar. 24, 2005

(65) Prior Publication Data

US 2005/0241827 A1 Nov. 3, 2005

Related U.S. Application Data

(63) Continuation-in-part of application No. 10/376,182, filed on Feb. 26, 2003, now Pat. No. 6,971,448.

(51) Int. Cl.
*E21B 43/27* (2006.01)
*E21B 33/13* (2006.01)

(52) U.S. Cl. .................................. 166/300; 166/288

(58) Field of Classification Search .................. None
See application file for complete search history.

(56) References Cited

U.S. PATENT DOCUMENTS

| | | |
|---|---|---|
| 3,728,331 A | 4/1973 | Savage |
| 3,794,115 A | 2/1974 | Skagerberg |
| 4,568,481 A | 2/1986 | Harris, Jr. |
| 4,753,659 A | 6/1988 | Bayerlein et al. |
| 4,766,959 A | 8/1988 | Allison |
| 4,828,726 A | 5/1989 | Himes et al. |
| 4,874,854 A | 10/1989 | Colegrove et al. |
| 4,974,678 A | 12/1990 | Himes et al. |
| 4,977,962 A | 12/1990 | Himes et al. |
| 5,097,904 A | 3/1992 | Himes |
| 5,184,680 A | 2/1993 | Totten et al. |
| 5,197,544 A | 3/1993 | Himes |
| 5,273,580 A | 12/1993 | Totten et al. |
| 5,330,005 A | 7/1994 | Card et al. |
| 5,439,055 A | 8/1995 | Card et al. |
| 5,501,275 A | 3/1996 | Card et al. |
| 5,708,162 A | 1/1998 | Hilbig et al. |
| 5,775,425 A | 7/1998 | Weaver et al. |
| 5,787,986 A | 8/1998 | Weaver et al. |
| 5,833,000 A | 11/1998 | Weaver et al. |
| 5,839,510 A | 11/1998 | Weaver et al. |
| 5,853,048 A | 12/1998 | Weaver et al. |
| 5,871,049 A | 2/1999 | Weaver et al. |
| 6,047,772 A | 4/2000 | Weaver et al. |
| 6,488,091 B1 | 12/2002 | Weaver et al. |
| 2003/0045708 A1 | 3/2003 | Magallanes et al. |

FOREIGN PATENT DOCUMENTS

| | | |
|---|---|---|
| EP | 0 030 443 A1 | 2/1980 |
| EP | 1 267 034 A2 | 12/2002 |
| WO | WO 93/15116 A1 | 8/1993 |
| WO | WO 03/001030 A1 | 1/2003 |

OTHER PUBLICATIONS

David Craig, et al., The Degradation of Hydroxypropyl Guar Fracturing Fluids By Enzyme, Oxidative, and Catalyzed Oxidative Breakers, Proceedings of the 39th Annual (Cont'd).
E. Frollini, et al, "Polyelectrolytes from Polysaccharides: Selective Oxidation of Guar Gum—A Revisited Reaction," 27 Carbohydrate Polymers 129-135 (1995).
Tatsuro Ouchi, et al, "Synthesis and Cytotoxic Activity of Oxidized Galactomannan/ADR Conjugate," J.M.S.-Pure Appl. Chem., A34(6), pp. 975-989 (1977).
Akash Tayal, et al, "Degradation of a Water-Soluble Polymer: Molecular Weight Changes and Chain Scission Characteristics," 33 Macromolecules 9488-9493 (2000).
B.R. Vijayendran, et al., "Absolute Molecular Weight and Molecular Weight Distribution of Guar by Size Exclusion Chromatography and Low-angle Laser Light Scattering," (cont'd).
PCT International Search Report from a related application, PCT/GB 03/05422, mailed Mar. 18, 2004 (3 pages).

*Primary Examiner*—Jennifer H. Gay
*Assistant Examiner*—Angela DiTrani
(74) *Attorney, Agent, or Firm*—Craig W. Roddy; Karen Tripp

(57) ABSTRACT

Methods and compositions for sealing subterranean zones having temperatures in the range of about 80° F. to about 300° F. are provided. In a method of the invention, a sealing composition of the invention of water, a substantially fully hydrated depolymerized polymer and poly lactic acid, with a pH above about 8.5, is introduced into the subterranean zone wherein it becomes substantially rigid and seals the zone when exposed to subterrnean zone temperatures above about 80° F.

11 Claims, No Drawings

SELF-DISSOLVING LOST CIRCULATION TREATMENT FOR PRODUCING FORMATIONS

RELATED APPLICATION

This application is a continuation-in-part of U.S. patent application Ser. No. 10/376,182, entitled "Method and Compositions for Sealing Subterranean Zones" of Billy F. Slabaugh, Jimmie D. Weaver, Trinidad Muñoz, Jr., and Bradley L. Todd, filed Feb. 26, 2003, issued as U.S. Pat. No. 6,971,448 on Dec. 6, 2005.

BACKGROUND OF THE INVENTION

1. Field of the Invention

The present invention relates to methods and compositions for preventing or alleviating the loss of drilling fluids into a subterranean formation during drilling of boreholes in said formation. More particularly, the present invention relates to methods and compositions suitable for preventing or alleviating lost circulation in a producing zone.

2. Description of Relevant Art

In the oil and gas industry, a common problem in drilling wells or boreholes in subterranean formations is the loss of circulation of fluids, such as drilling fluids or muds or well treatment fluids, in a well or borehole during the drilling. Such lost fluids typically go into fractures induced by excessive mud pressures, into pre-existing open fractures, or into large openings with structural strength in the formation.

A large variety of materials have been used or proposed in attempts to cure lost circulation. Generally, or commonly, such materials may be fibrous (like shredded automobile tires or sawdust), flaky (such as wood chips or mica flakes), granular (such as ground nutshells), or slurries, whose strength increases with time after placement, (such as hydraulic cement, or polyacrylamide dispersed in water, emulsified, and often crosslinked in a paraffinic mineral oil, often also containing bentonite). However, such lost circulation compositions have often been unsuccessful due to overly delayed and inadequate viscosity development. The delay in developing viscosity allows the lost circulation or sealing composition to be diluted and displaced into subterranean producing zone(s) into or near the lost circulation zone thereby damaging the producing zone(s). Also, such sealing compositions have often been difficult or impossible to remove from the subterranean producing zones into which they have penetrated.

To prevent damage to a producing zone in or near a lost circulation zone, the producing zone should be sealed with a sealing composition that can subsequently be removed to prevent drilling fluid damage to the producing zone. There continues to be a need for improved methods and compositions to effect such sealing of producing zones where the sealing material can be readily and completely or substantially completely removed from the zone and where the sealing material does not otherwise damage the producing zone.

SUMMARY OF THE INVENTION

The present invention provides improved sealing compositions and methods which overcome the deficiencies of the prior art and meet the needs described above, while having the further advantage of being environmentally compatible. A method of this invention for sealing a subterranean zone, having a temperature in the range from about 80° F. to about 300° F., to prevent the uncontrolled flow of fluids into the zone, is comprised of the following steps. A subterranean zone sealing composition that becomes substantially rigid when exposed to subterranean zone temperatures above about 80° F. and has a pH above about 8.5 is provided. The sealing composition comprises water, a substantially fully hydrated depolymerized polymer carrier, and particulate materials comprising poly lactic acid, magnesium oxide (or other particulate material that is preferably biocompatible and preferably soluble in both acids and in ammonium salts), and preferably acid soluble fibers that are preferably environmentally compatible and non-reactive with producing zones. The composition preferably further comprises a cross-linking agent for the polymer, such as for example boron or a boron compound, and salts of ammonium chloride and/or ammonium citrate. The sealing composition is introduced into the subterranean zone wherein it becomes substantially rigid and seals the zone. Over time, the poly lactic acid will hydrolyze producing lactic acid which will in turn break the polymer substrate and thereby "self-dissolve" the seal over the zone. The ammonium salts, if used, in turn will dissolve the magnesium oxide, enhancing the dissolution of the seal, and any excess lactic acid may also aid in dissolution of magnesium oxide. When a faster dissolution of the seal is desired, the sealing composition may be contacted with an acid fluid, or when a boron compound is used as the cross-linking agent, with a fluid having a pH below about 8, to break the sealing composition.

The subterranean zone sealing compositions that become substantially rigid when exposed to subterranean zone temperatures above about 80° F., that have a pH above about 8.5, and that can self-dissolve over time are basically comprised of water, a substantially fully hydrated depolymerized polymer and poly lactic acid. The poly lactic acid hydrolyzes over time and breaks the polymer substrate so that the hydrated depolymerized polymer remaining is of small molecular size, is readily resolubilized and flows out of the subterranean zone with produced fluids.

The features and advantages of the present invention will be readily apparent to those skilled in the art upon a reading of the description of preferred embodiments which follows.

DESCRIPTION OF PREFERRED EMBODIMENTS

The present invention provides improved methods and sealing compositions for sealing a subterranean zone having a temperature in the range of from about 80° F. to about 300° F. to prevent the uncontrolled flow of fluids into the zone. A method of this invention is comprised of the following steps.

A subterranean zone sealing composition is provided that becomes substantially rigid when exposed to subterranean zone temperatures above about 80° F. and has a pH above about 8.5. The sealing composition is basically comprised of water, a substantially fully hydrated depolymerized polymer carrier, and particulate materials. The particulate materials comprise poly lactic acid, in powdered, pelletized or shredded form, magnesium oxide (or other particulate material that is preferably biocompatible and preferably slowly soluble in both acids and in ammonium salts), and preferably acid soluble fibers that are preferably suitable for use in producing zones as well as in non-producing zones, such as for example EZ PLUG™ material, available from Halliburton Energy Services, Inc. in Houston, Tex. and Duncan, Okla. As an example, more than 300 pounds per barrel of magnesium oxide might be included to weight the composition to comprise a pill for treatment or sealing of a zone.

The composition preferably further comprises a cross-linking agent for the polymer, such as for example a boron compound, particularly if the polymer is not already crosslinked, and salts of either or both ammonium chloride and ammonium citrate, although the invention is also believed effective with non-crosslinked hydrated depolymerized polymer.

The sealing composition is introduced into the subterranean zone to be sealed wherein it becomes substantially rigid and seals the zone. Over time, this rigid sealing composition will self-dissolve, opening the zone for production of fluids from the formation. This self dissolution of the seal is believed to occur as the poly lactic acid hydrolyzes over time, producing lactic acid which in turn breaks the polymer substrate and thereby "self-dissolves" the seal over the zone. The ammonium salts, if used, dissolve the magnesium oxide, enhancing the dissolution of the seal. Any excess lactic acid may aid in dissolution of magnesium oxide. When a faster dissolution of the seal is desired, the sealing composition may be contacted with an acid fluid, or when a boron compound is used as the cross-linking agent, with a fluid having a pH below about 8, to break the sealing composition.

The water used in the sealing composition of the invention may be fresh water or salt water. The term "salt water" is used herein to mean unsaturated salt water and saturated salt water including brines and seawater. The water used is included in the sealing composition in an amount in the range of from about 60% to about 96% by weight of the sealing composition.

The substantially fully hydrated depolymerized polymers which are useful in accordance with this invention are substantially fully hydrated depolymerized guar or cellulose derivative polymers. Such substantially fully hydrated depolymerized polymers may be manufactured using derivatization and depolymerization techniques known in the art or as described in U.S. Patent Application Ser. No. 60/297,345 entitled "Galactomannan Compositions and Methods for Making and Using the Same," filed on Jun. 11, 2001 by Jesse Magallanes, Sylvain Diguet and William Stivers, or U.S. Pat. No. 6,488,091 to Jim D. Weaver, et al, issued Dec. 3, 2002; the entire disclosures of which are incorporated herein by reference.

In a preferred embodiment, the depolymerized polymer is prepared by adding the polymer to be depolymerized to a reaction vessel together with a quantity of hydrogen peroxide and water. The reactor vessel is heated to an elevated temperature such as about 100° F. to initiate the reaction if the ambient temperature is insufficient to initiate the reaction. Once initiated, the depolymerization reaction is exothermic, and the temperature of the reactor vessel generally should be maintained in the range of from about 100° F. to about 200° F. for a sufficient time for the polymer to degrade to the desired molecular weight. Alternatively, the polymer may be formed from lower molecular weight monomers that are polymerized until the desired molecular weight is achieved. The hydratable polymer used for forming the short chained segments can be substantially any polysaccharide and is preferably a guar or cellulose derivative polymer selected from the group consisting of hydroxpropylguar, carboxymethylhydroxypropylguar, carboxymethyl-guar, hydroxyethylguar, carboxymethylhydroxyethylguar, hydroxyethylcellulose, hydroxyethylcellulose grafted with glycidol or vinyl phosphonic acid, carboxymethylcellulose and carboxymethylhydroxyethylcellulose. Of these, depolymerized hydroxypropylguar is most preferred.

The depolymerized polymer should have an average molecular weight in the range of from about 25,000 to about 400,000 and preferably has an average molecular weight in the range of from about 100,000 to about 250,000. The depolymerized polymer preferably should have a polydispersity ratio of from 1 to about 12 as determined by gel permeation chromatography, such as disclosed in "PRACTCAL HIGH PERFORMANCE LIQUID CHROMATOGRAPHY," edited by C. F. Simpson (Hyden & Son Ltd., 1976). While the polydispersity ratio of polysaccharides or other polymers generally can range from about 2 to as much as 250, the depolymerized polymer of the present invention has been found to exhibit the superior properties identified herein when maintained within the indicated preferred polydispersity ratio. The depolymerized polymer is hydrated to form a depolymerized fluid concentrate. If desired for purposes of transportation, storage or otherwise, the depolymerized polymer may be stored in dry form and, when needed, may be hydrated to form the treating fluid concentrate. The substantially fully hydrated depolymerized polymer concentrate may be admixed with water whereby the polymer is present in an amount of about 6% to an excess of about 30% by weight and most preferably from about 6% to about 11% by weight of the concentrate. The viscosity of the treating fluid concentrate may generally be in the range of from about 15,000 to an excess of about 35,000 centipoises as determined using a Brookfield DVII plus RV spring viscometer manufactured by Brookfield Engineering Laboratories of Middleboro, Mass. The viscosity is determined by measurements performed at a temperature of about 75° F. and a rotational speed of about 20 rpm using an LV3 Bob. Other similar instruments can also be used to measure the viscosity of the fluid concentrate.

The water used to form the treating fluid concentrate can be fresh water or salt water including sodium chloride or potassium chloride in an amount in the range of from about 13% to about 20% by weight of the water. Generally the substantially fully hydrated depolymerized polymer used in the present invention is mixed with the water in an amount in the range of from about 5% to about 30% by weight of the water.

A variety of additives can be included in the concentrate of this invention at the time of its manufacture. Such additives generally include pH adjusting compounds for adjusting the pH of the treating fluid to an optimum or desired pH for cross-linking. Examples of such compounds which can be used include, but are not limited to, sodium hydroxide, lithium hydroxide, fumaric acid, formic acid, acidic acid, acidic anhydride and hydrochloric acid. When used, the pH adjusting compound is included in the concentrate in an amount in the range of from about 0.05% to about 5% by weight of the water therein.

A pH buffer can also be included in the concentrate. Examples of buffers which can be used include, but are not limited to, sodium carbonate, sodium bicarbonate, potassium bicarbonate, sodium diacetate, potassium diacetate, sodium phosphate, potassium phosphate, sodium dihydrogen phosphate and potassium dihydrogen phosphate. When used, the buffer is included in the concentrate in an amount in the range of from about 0.05% to about 15% by weight of the water therein.

Another additive which can be included in the concentrate is a surfactant for preventing the formation of emulsions between the sealing composition and subterranean formation fluids. Examples of surfactants which can be used include, but are not limited to, alkyl sulfonates, alkyl aryl sulfonates, dodecylbenzene sulfonic acid, alkyl trimethylammonium chloride, branched alkyl ethoxylated alcohols, phenol-formaldehyde non-ionic resin blends, cocobetaines, dioctyl sodium sulfosuccinate, imidazolines, alpha olefin sulfonates, linear alkyl ethoxylated alcohols and trialkyl benzyl ammonium chloride. Of these, dodecylbenzene sulfonic acids are preferred. When used, the surfactant is included in the concentrate in an amount in the range of from about 0.01% to about 1% by weight of the water therein.

Yet another additive which can be included in the concentrate is a clay stabilizer. Examples of clay stabilizers which can be used include, but are not limited to, potassium chloride, sodium chloride, ammonium chloride and tetramethylammonium chloride. Of these, potassium chloride and tetramethylammonium chloride are preferred. When used, the clay stabilizer is included in the concentrate in an amount in the range of from about 2% to about 20% by weight of water therein.

When the concentrate containing the substantially fully hydrated depolymerized polymer is mixed with additional water, if necessary, to form the sealing composition of this invention, no hydration time is required since the concentrate is already substantially fully hydrated. The additional water can be mixed with the concentrate in a water to concentrate ratio in the range of from about 4:1 to about 20:1. Generally, additional water is added to the concentrate whereby the water is present in the sealing composition in an amount in the range of from about 60% to about 96% by weight of the composition.

The substantially fully hydrated depolymerized polymer used in accordance with this invention is preferably a substantially fully hydrated depolymerized guar or cellulose derivative polymer. Examples of such polymers include, but are not limited to, hydroxypropylguar, carboxymethylhydroxypropylguar, carboxymethylguar, hydroxyethylguar, carboxymethylhydroxyethylguar, hydroxyethylcellulose, grafted hydroxyethylcellulose, carboxymethylcellulose and carboxymethylhydroxyethylcellulose. Of these, a substantially fully hydrated depolymerized hydroxypropylguar is preferred. Commercially available substantially fully hydrated depolymerized polymers suitable for use in the invention include, but are not limited to, HMP™ polymer, Halliburton's MicroPolymer™ material, a substance 25 to 30 times smaller than conventional polymers, available from Halliburton Energy Services, Inc. in Houston, Tex. and Duncan, Okla. The substantially fully hydrated depolymerized polymer is present in the sealing composition in an amount in the range of from about 0.5% to about 2% by weight of the composition.

The cross-linking agent, if included in the sealing composition, cross-links the substantially fully hydrated depolymerized polymer in the sealing composition increasing its viscosity and facilitates the sealing composition becoming substantially rigid at subterranean zone temperatures in the range of from about 80° F. to about 300° F. Examples of cross-linking agents which can be used in accordance with this invention include, but are not limited to, boron compounds, compounds that supply zirconium IV ions, compounds that supply titanium IV ions, ammonium compounds, compounds that supply antimony compounds, dehydrated boric acid and dehydrated sodium tetraborate. While the cross-linking agent used can be encapsulated to delay the sealing composition from becoming highly viscous until it is placed in the subterranean zone to be sealed, dehydrated boric acid and dehydrated sodium tetraborate are relatively slow in cross-linking the sealing composition without being encapsulated. Generally, the dehydrated boric acid or sodium tetraborate have cross-linking times in the range of about 6 to about 30 minutes. Of the various cross-linking agents that can be utilized, dehydrated sodium tetraborate is preferred. The cross-linking agent, if used, is generally present in the sealing composition in an amount in the range of from about 0.025% to about 0.1% by weight of the composition.

As noted above, after the sealing composition of this invention has been introduced into a subterranean zone to be sealed and forms a substantially rigid sealing mass therein, the poly lactic acid will hydrolyze over time producing lactic acid which will in turn break the polymer substrate and thereby "self-dissolve" the seal over the zone. Any poly lactic acid may aid in dissolution of magnesium oxide. When a faster dissolution of the seal is desired, the sealing composition may be contacted with an acid fluid, or when a boron compound is used as the cross-linking agent, with a fluid having a pH below about 8, to break the sealing composition.

The broken polymer molecules are of a small size that are easily resolubilized by well bore fluids and readily flow out of the subterranean zone. This is contrasted with prior art sealing polymers which form filter cakes and insoluble skins that control fluid loss but are very difficult to remove.

A preferred method of this invention for sealing a subterranean zone having a temperature in the range of from about 80° F. to about 300° F. to prevent the uncontrolled flow of fluids into the zone is comprised of the steps of: (a) providing a subterranean zone sealing composition that becomes substantially rigid when exposed to subterranean zone temperatures above about 80° F. and has a pH above about 8.5, comprising water, a substantially fully hydrated depolymerized polymer carrier, and particulate materials comprising poly lactic acid, magnesium oxide, and also preferably acid soluble fibers such as EZ PLUG™ material available from Halliburton Energy Services, Inc.; and (b) introducing the sealing composition into the subterranean zone wherein it becomes substantially rigid and seals the zone.

The present invention is well adapted to carry out the objects and attain the ends and advantages mentioned as well as those which are inherent therein. While numerous changes may be made by those skilled in the art, such changes are encompassed within the spirit and scope of this invention as defined by the appended claims.

What is claimed is:

1. A method of sealing a subterranean zone to prevent the uncontrolled flow of fluids into the zone, said subterranean zone having a temperature above about 80° F., said method comprising the steps of:
   a. providing a subterranean zone sealing composition comprising water, a substantially fully hydrated depolymerized polymer and a poly lactic acid, wherein said composition becomes rigid when exposed to subterranean zone temperatures in the range of from about 80° F. to about 300° F. and has a pH above about 8.5; and
   b. introducing said sealing composition into said subterranean zone wherein it becomes substantially rigid and seals said zone.

2. The method of claim 1 wherein said composition further comprises a crosslinking agent.

3. The method of claim 2 wherein said composition further comprises magnesium oxide, acid soluble fillers, and ammonium salts.

4. The method of claim 3 wherein said ammonium salts are ammonium chloride, ammonium citrate, or both.

5. The method of claim 3 wherein said substantially fully hydrated depolymerized polymer is substantially fully hydrated depolymerized hydroxypropylguar.

6. The method of claim 1 further comprising the steps of allowing said substantially rigid sealing composition to dissolve over time.

7. The method of claim 1 wherein said substantially rigid sealing composition self-dissolves over time.

8. The method of claim 1 further comprising contacting said substantially rigid sealing composition with acid to remove same from said zone.

9. A method for protecting a producing zone in a subterranean formation from damage from drilling fluids or lost circulation materials used in drilling a borehole through said zone, wherein said zone has a temperature above about 80° F., said method comprising introducing into said zone a composition comprising water, substantially fully hydrated depolymerized polysaccharide polymer and poly lactic acid having a pH above about 8.5, wherein said composition becomes substantially rigid in said zone.

10. The method of claim 9 wherein said polymer has an average molecular weight in the range of from about 25,000 to about 400,000 and a polydispersity ratio of from 1 to about 12.

11. The method of claim 10 wherein said composition loses said rigidity and dissolves over time for removal from said zone.

* * * * *